United States Patent Office 2,710,808
Patented June 14, 1955

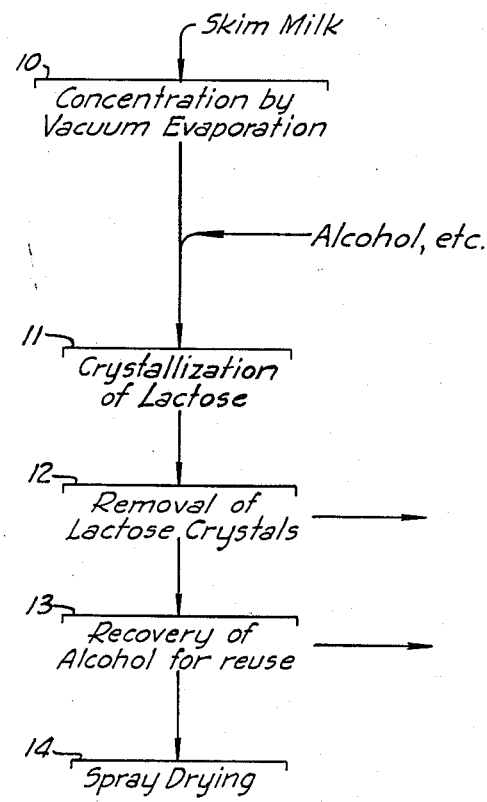

2,710,808

MILK TREATMENT PROCESS

David D. Peebles, Hillsborough, and Paul D. Clary, Jr., Petaluma, Calif., assignors to Western Condensing Company, San Francisco, Calif., a corporation of California Application March 5, 1951, Serial No. 213,844

2 Claims. (Cl. 99—55)

This invention relates generally to processes for the manufacture of partially delactosed milk products.

There are many instances in which it is desirable to market a milk product having a relatively low lactose content. Particular reference can be made to the ice cream industry where a high percentage of lactose in the ice cream mix tends to cause undesirable coarse lactose crystals in the final frozen confection. Prior processes which have been proposed for the removal of lactose from lacteal materials such as skim milk have not been satisfactory in many respects. Lactose cannot be satisfactorily removed by crystallization according to methods employed in the manufacture of lactose from whey, because of the relatively viscous consistency of a skim milk concentrate having sufficient concentration for lactose crystallization. It has been proposed to add cane sugar to skim milk to enable attainment of 70% solids concentration without undue viscosity, thereby facilitating crystallization and removal of lactose. Such a process, however, is unsatisfactory because even with such sugar syrup being present, it is difficult to remove the lactose crystals, and the removed crystals are heavily coated with protein.

In addition to the methods outlined above, it has been proposed to split a portion of the lactose as by enzymic action to form sugars which do not crystallize out when the material is used in ice cream mixes. Insofar as applicants are aware, such processes have not proven to be commercially feasible, and they have resulted in the presence of objectionable by-products.

It is an object of the present invention to provide a new process for the removal of lactose from lacteal materials like skim milk, and which will make possible the production of a high quality edible material having good flavor characteristics and suitable for use in ice cream mixes and other products for human consumption.

Another object of the invention is to provide a process of the above character which greatly facilitates removal of lactose from skim milk concentrates and which makes possible the production of a high protein skim milk powder.

Another object of the invention is to provide a new partially delactosed milk product having novel characteristics.

Further objects of the invention will appear from the following description in which the preferred embodiment of the invention has been set forth in detail in conjunction with the accompanying drawing.

In general the present invention involves preparing a concentrate from skim milk or other lacteal material containing milk protein and lactose. The concentrate is diluted with a water-miscible solvent such as ethyl alcohol or acetone, and in conjunction with such dilution or immediately thereafter the material is cooled to cause crystallization of lactose. The extent of dilution is such that at temperatures of the order of 32° F. or lower the concentrate has relatively good fluidity. After crystallization of a substantial portion of the lactose, the crystalline material is removed by suitable methods such as centrifuging. Crystallization takes place from a highly supersaturated lactose solution because of the dehydrating action of the solvent. After removal of lactose crystals the solvent is recovered from the remaining concentrate, after which the concentrate can be dried to form a powdered product.

Referring to the flow sheet of the accompanying drawing, we have shown skim milk being supplied to the concentrating operation 10 where it is concentrated by vacuum evaporation to produce a relatively viscous concentrate containing say from 35 to 55% solids. Preferably this treatment is such as to avoid subjecting the material to elevated temperatures capable of causing substantial coagulation of milk protein. Thus it is desirable to employ treatment temperatures ranging from say 100 to 150° F. However special heat treatment can be applied for producing special products. For example when producing a product for the baking industry it is desirable to subject the skim milk to preliminary heating to a temperature of the order of 180° F. for a period of 1.5 hours.

As indicated in the flow sheet, a suitable water-miscible solvent, such as ethyl alcohol, is blended with the concentrate. Immediately prior to such blending it is desirable to cool the hot concentrate to a temperature at which blending can be carried out without excess evaporation of the solvent, as for example to a temperature of about 80° F. The solvent should be added at a relatively slow rate and the material should be agitated during dilution in order to avoid localized precipitation of protein. A sufficient amount of solvent is added to substantially increase the fluidity of the concentrate. However, care should be taken to avoid addition of too much solvent such as would cause precipitation of protein prior to removal of the lactose crystals. In general, assuming that fresh skim milk is employed and is evaporated to 50% solids concentrate, the amount of solvent added can range from 10 to 45% (by weight) of the concentrate. Beyond about 45% solvent some coagulation of protein takes place either immediately or prior to removal of the crystallized lactose.

In step 11, following dilution with solvent, a substantial part of the lactose content is caused to crystallize. This step can be carried out in a single crystallizing operation by gradually cooling the material to a low temperature of the order of from 40 to 32° F. or lower, with retention for a time period sufficient for the percentage lactose removal desired. We prefer however to carry out crystallization in more than one step or operation, with initial crystallization at a temperature level somewhat higher than the second or final operation, and with reheating between the crystallizing operations to accelerate conversion of beta to alpha lactose. Thus assuming that after dilution with solvent the material is at a temperature of the order of from 70 to 80° F. it can be cooled relatively rapidly to a temperature of the order of 60° F., and then cooled more slowly (e. g. over a period of 5 to 8 hours) to a temperature level within the range of say from 32 to 50° F. Within this temperature range the lactose rapidly crystallizes from the highly supersaturated lactose solution. The material is held at this temperature level for a period of the order of from 15 to 25 hours, during which time crystallization proceeds at a diminishing rate. At the end of this crystallizing period the material is heated to a temperature level sufficient to accelerate conversion of beta to alpha lactose, as for example to a temperature level within the range of from say 50 to 65° F. Immediately thereafter the material is slowly cooled to a relatively low temperature for the final crystallizing operation. For example the material can be gradually cooled from the higher temperature level (e. g. 50 to 65° F.) over a period of from 15 to 20 hours, to a low temperature of the order of from 18 to 32° F. It is then held at this temperature level for a period of from 10 to 12 hours for further lactose crystallization.

It has been found unnecessary to introduce seed crystals of lactose into either the first or the second crystallizing operation. However if desired, in the first operation, one can introduce seed crystals of lactose previously made by use of the process.

Immediately following the crystallizing step 11 the material is subjected to suitable treatment 12 for removal of the lactose crystals. This can be carried out by use of suitable hydraulic separating equipment or by a suitable centrifuge. The crystals removed in operation 12 are relatively free of protein, and when washed form a relatively pure by-product lactose.

The natant liquor from the lactose removal operation 12 is submitted to treatment at 13 for removal of the solvent content. This can be carried out by conventional methods of distillation, followed by rectification of the solvent to prepare the same for re-use in the process. Following removal of the solvent, the material can be dried to form a powdered product, as by a spray drying operation 14.

A specific example of the process can be outlined as follows: Fresh skim milk containing 4.98% lactose was submitted to vacuum evaporation to produce a concentrate containing 48% solids. The concentrate as discharged from the evaporator was at a temperature of about 100° F. After initial cooling of the concentrate to about 80° F., ethyl alcohol was added amounting to 12% by weight of the liquid fraction. This mixture was rapidly cooled to a temperature of 60° F., and then gradually cooled over a period of about 6 hours to 45° F., at which temperature it was retained for a period of 18 hours. During this period of retention crystallization of lactose took place. After this period of crystallization the material was heated over a period of about 4 hours to a temperature of 50° F. Immediately thereafter the material was gradually cooled to a temperature of 24° F. over a period of 8 hours, and was retained at that temperature for a period of 16 hours, during which time further crystallization took place. The material was then subjected to centrifuging whereby the lactose crystals were removed. The total time period elapsing between initial introduction of alcohol and removal of the lactose crystals by centrifuging was about 48 hours. After centrifuging the material was subjected to distillation for removal of the alcohol content. At that time there was no appreciable evidence of protein precipitation. The concentrate remaining after distillation was then spray dried to form a powder which analyzed as follows:

50% protein (by weight)
0.5% fat
30.0% lactose
11.0% ash
2.0% acid (as lactic)
4.0% moisture From the foregoing example it is evident that our process greatly facilitates removal of lactose crystals after the crystallizing operation, and that this operation is aided by the relatively high fluidity of the diluted material. The low percentage of protein removed with the crystals greatly facilitates subsequent refining of the lactose, and in addition it avoids undesirable reduction of the protein content of the natant liquor. The low temperature at which crystallization can take place makes possible crystallization of lactose from a supersaturated lactose solution of low viscosity and is made possible by the fact that the solvent content depresses the freezing point of the material. In the foregoing example the freezing point of the diluted mixture was about 20° F., and crystallization was carried out at 24° F.

As previously stated it is advantageous to carry out crystallization of the lactose in two crystallizing operations. As is well understood, both beta and alpha lactose commonly exist in a lactose solution. It is the alpha form of lactose which undergoes crystallization, and this is accompanied by continual conversion of beta to alpha lactose. Reheating of the material after the first crystallizing operation tends to accelerate conversion of beta to alpha lactose, thereby promoting more rapid lactose crystallization in the second crystallizing operation. In addition the preferred procedure described promotes the growth of larger lactose crystals which can be more easily removed and washed.

Reference has been made to the fact that according to the present process protein is not precipitated or coagulated, but remains dispersed throughout the process. A solvent like alcohol can be employed to precipitate protein by virtue of its dehydrating action. However, in the present process the solvent does not precipitate or coagulate protein because a limited amount of the solvent is added to the concentrate.

As previously stated the low temperature for the second crystallizing operation may range from 32 to 18° F., and the amount of solvent added may range from 5 to 25% of the liquid fraction of the concentrate. Increased amounts of solvent are desirable for the lower concentrations and for the lower crystallization temperatures.

The product produced by our process has many novel and desirable characteristics. Assuming that care has been taken to avoid use of excessive treatment temperatures, the protein is in substantially the same form as in natural skim milk. The ratio of lactalbumin to casein, and also the mineral salt balance, remains unchanged. In general the powdered product is a high quality partially delactosed skim milk powder, which has excellent flavor and palatability, and which has high solubility in that it readily redisperses in water.

When our delactosed material is used for ice cream mixes, it may be desirable to add one or more sugars to provide a sweetened flavor. Thus immediately prior to spray drying a suitable sugar syrup can be added as, for example, from 10 to 60% sucrose. Likewise other ingredients can be added immediately prior to drying as, for example, gelatin, alginates, and the like.

Our process can be used to produce dry powdered products having a substantial fat content. Thus immediately before spray drying we can add a water-fat emulsion prepared by homogenizing a material comprising from 10 to 52% fat, 45 to 89% water, and 1.2 to 3.1% sodium caseinate. The fat can be unsweetened washed dairy butter, butter oil, or a hydrogenated vegetable oil having a melting point of from 90 to 110° F. Also we can employ an animal fat such as lard. The procedure employed in manufacturing the emulsion may be as disclosed in copending application Serial No. 183,188 filed Sept. 5, 1950 in the names of David D. Peebles and Murray D. Girvin and entitled "Fat Emulsion and Method of Manufacture." The amount of the emulsion added may vary according to the fat content desired. In this manner we can produce a dry powdered product having a low lactose content but otherwise simulating whole milk.

A powdered product made as described above has keeping properties greatly superior to conventional powdered milk products having a substantial fat content. In addition such a product is free of objectionable cooked or off flavors, due to absence of high temperature or other detrimental treatment of the nonfat solids. High temperature sterilization is not required in the preparation of such material, as is the case with manufacture of whole milk powder by conventional methods, where high temperature sterilization is required to prevent rapid deterioration of the powder. Therefore the protein content of the product is substantially uncoagulated.

We claim:

1. In a process for the manufacture of a partially delactosed product from skim milk, the skim milk having its protein content substantially entirely uncoagulated, the steps of concentrating the skim milk to provide a relatively viscous concentrate containing from 35 to 55 percent solids, adding a water-miscible solvent to the concentrate to provide a relatively fluid material containing from 5 to 25 percent of the solvent in the liquid fraction, cooling the material to a temperature of the order of from 32 to 50° F., permitting lactose to crystallize in the cool material over a period of crystallization during which the protein content remains dispersed, reheating the material to a temperature of the order of from 50 to 65° F., again cooling the material to a temperature of the order of from 18 to 32° F., permitting further lactose to crystallize from the cool material over a second period of crystallization during which the protein content remains dispersed, and then removing lactose crystals from the liquid fraction.

2. In a process for the manufacture of a partially delactosed product from skim milk, the protein content of the skim milk being substantially entirely uncoagulated, the steps of concentrating the material by vacuum evaporation without substantial coagulation of protein to provide a relatively viscous concentrate containing from 35 to 55 percent solids, adding a water miscible solvent to the concentrate to provide a relatively fluid material containing from 5 to 25% of the solvent in the liquid fraction, slowly cooling the material to a temperature of the order of from 32 to 50° F., over a period of the order of from 5 to 8 hours, permitting the lactose to crystallize in the cooled material over a period of crystallization of the order of from 15 to 25 hours, the protein content remaining in dispersed form during such crystallization, reheating the material to a temperature of the order of from 50 to 65° F., again gradually cooling the material to a temperature of the order of from 18 to 32° F. over a period of the order of from 15 to 20 hours, permitting further lactose to crystallize from the cooled material over a period of from 10 to 12 hours, the protein remaining in dispersion during said last named period, and then removing lactose crystals from the remaining material.

References Cited in the file of this patent

UNITED STATES PATENTS

| 735,148 | Ramage | Aug. 4, 1903 |
| 2,116,931 | Leviton | May 10, 1938 |

FOREIGN PATENTS

| 546,447 | Great Britain | July 14, 1942 |

OTHER REFERENCES

Ind. & Eng. Chem., vol. 30, No. 11, pages 1305–1311; article by A. Leviton and A. Leighton.